2 Sheets--Sheet 2.
C. V. WOERD.
Watchmakers' Lathes.
No. 144,178. Patented Oct. 28, 1873.
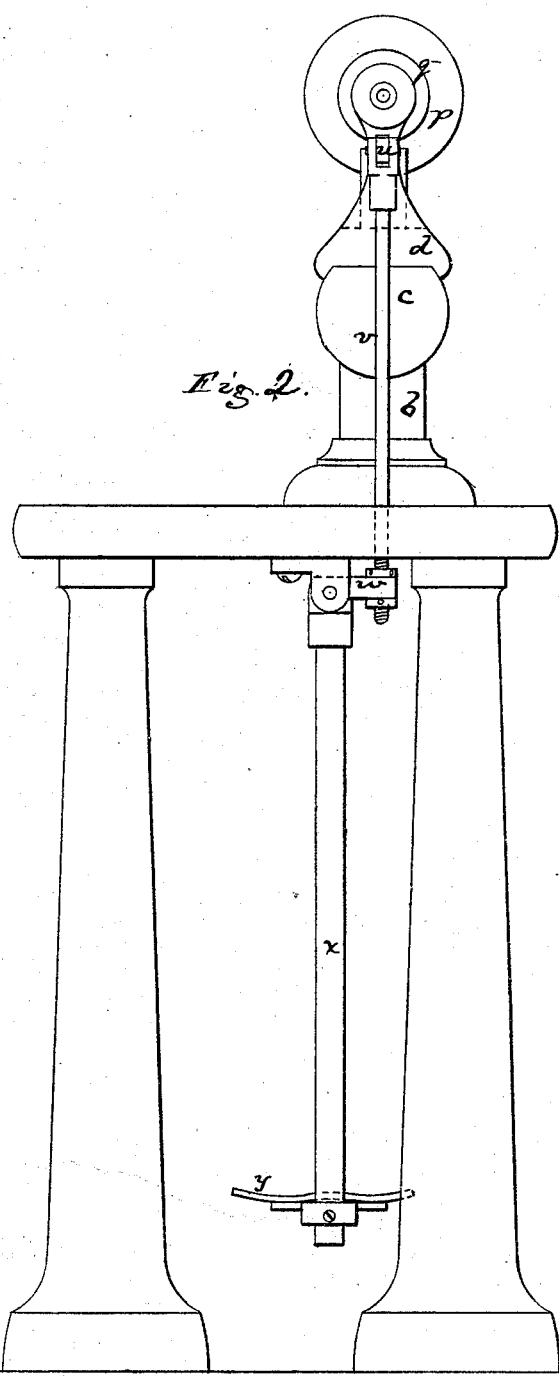
Witnesses.
M. W. Frothingham.
L. H. Latimer.
Inventor.
Charles V. Woerd
By his Attys.
Crosby & Gould
AM. PHOTO-LITHOGRAPHIC CO. N.Y. (OSBORNE'S PROCESS.)

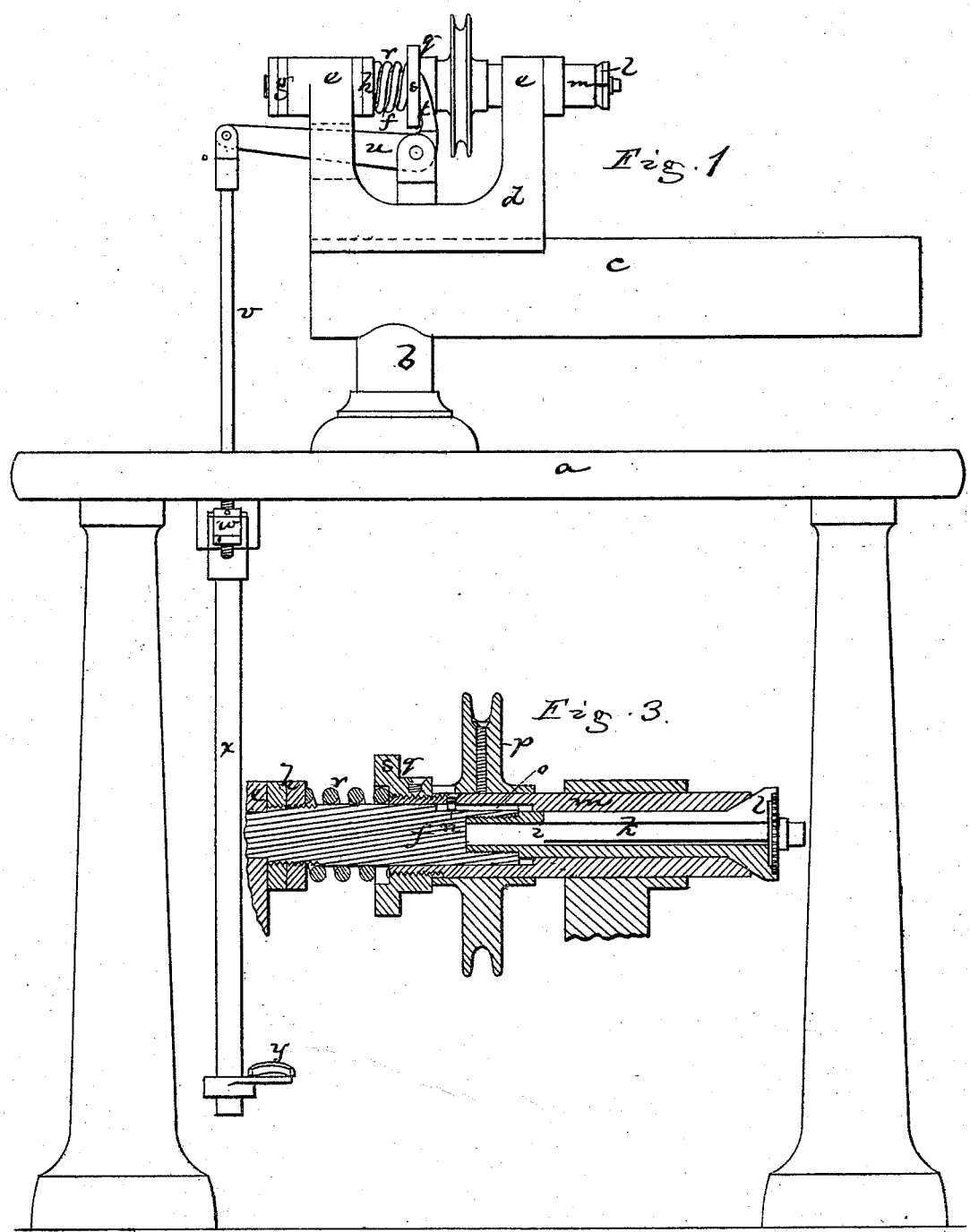

UNITED STATES PATENT OFFICE.

CHARLES V. WOERD, OF WALTHAM, MASSACHUSETTS.

IMPROVEMENT IN WATCHMAKERS' LATHES.

Specification forming part of Letters Patent No. 144,178, dated October 28, 1873; application filed April 16, 1873.

*To all whom it may concern:*

Be it known that I, CHARLES V. WOERD, of Waltham, in the county of Middlesex and State of Massachusetts, have invented an Improvement in Gage-Lathes; and I do hereby declare that the following, taken in connection with the drawings which accompany and form part of this specification, is a description of my invention sufficient to enable those skilled in the art to practice it.

My invention relates to certain details in the organization of that class of lathes in which the work is chucked or griped in the jaws of a split hollow cone, and particularly to the arrangement of mechanism by which the work is griped in and released from the chuck.

In my construction the face of the chuck remains in the same plane, so that all classes of work are alike griped with reference to the position of such face, insuring uniform action of any tools whose movements are gaged with reference to said face; and the chuck being thus fixed, (except as to the radial movements of its jaws to gripe or release the work, and its rotative movement with the work,) its griping action is effected by means of a sleeve that encompasses the shank of the chuck, and is pressed forward to cause the chuck-jaws to move inward, (to gripe the work,) and back to release the jaws for the release of the work, the jaws expanding by their spring. Upon this sleeve is fixed the pulley, and back of the pulley a nut, which works on a screw-thread cut on the end part of the sleeve; and between this nut and nuts or collars on a shaft into which the rear end of the clutch-shank is screwed is a strong spring, the stress of which throws the clutch-sleeve forward, the stress of this spring being adjustably regulated by turning the nut, the nut having a flange of sufficient diameter to enable the nut to be readily turned by hand. Against this flange bears the short upright arm of a bent lever, having jointed to the end of its long horizontal arm a vertical link, that connects at its lower end with a short horizontal arm of a lever having a long pendent arm, bearing at its lower end a foot-piece, which, by slight pressure of the workman to move it laterally, effects, through its connection with the flange upon the clutch-sleeve, the rear movement of said sleeve to release the work from the gripe of the chuck.

My invention consists in the combination, with the longitudinally-immovable clutch and the sliding clutch-sleeve, the spring and the nut for variably adjusting the stress of the spring; and in the combination, with the clutch-sleeve moved by the spring, of the lever-connections for withdrawing the sleeve.

The drawing represents that part of the lathe embodying my invention.

Figure 1 shows the mechanism in side elevation. Fig. 2 is an end elevation thereof. Fig. 3 is a central vertical section of the clutch and the mechanism connected therewith.

*a* denotes the table upon which the lathe stands; *b*, the pillar, upon which is mounted the bed *c*. *d* is the head-stock; *e e*, bearings, in which the clutch-spindle rotates. *f* denotes the mandrel rotating directly in the rear bearing *e*, in which it is kept from end movement by check-nuts *g h*. In the front end of this mandrel is screwed the tail end *i* of a tubular clutch, having a slotted shank or body, *k*, and a conical head, *l*. The open mouth or front part of this head constitutes the chuck, and the work is griped between the jaws thereof, as seen in Fig. 3. Encompassing this chuck is a sleeve, *m*, that turns in the front bearing *e*, and also slides therein. This sleeve, by forward movement, presses the chuck-jaws together or upon the work, and, by rear movement, permits them to expand to release the work. The sleeve is splined to the mandrel, or has a pin, *n*, extending into a groove, *o*, in the mandrel, the sleeve thereby rotating the mandrel and chuck, but sliding upon them, the driving-pulley *p* being fixed upon the sleeve. The end part of the sleeve *m* is screw-threaded, and carries a nut, *q*; and between this nut and the nuts *g h* a strong spring, *r*, encompasses the mandrel, the stress of this spring throwing forward the chuck-sleeve with power sufficient to enable the clutch to gripe any work which it is adapted to receive. The stress of the spring may, however, be lessened or graduated by turning the nut *q*, such turning being facilitated by means of a flange, *s*. Under this flange is fulcrumed the releasing-lever, the short upright arm $t$ of which is forked, and stands just in front of the flange $s$, while the long horizontal arm $u$ is jointed, by a vertical link, $v$, to a very short horizontal arm, $w$, of a lever, fulcrumed just beneath the table $a$, (the rod $v$ extending through the table,) the vertical arm $x$ of this lever extending down to, or nearly to, the floor, and having a foot-piece, $y$, which is accessible to the workman, to enable him to readily swing the pendent arm $x$ in the opposite direction from the extension of the arm $w$. This lever mechanism is so arranged that it holds the fork normally out of contact with the flange $s$, while, by pressing the arm $x$ slightly forward, the lever acts with great power upon the flange to force it and the clutch-sleeve back, a very slight force thus applied overcoming the strongest stress of the spring $r$, and thereby enabling the work to be readily released.

I claim—

1. The combination and arrangement of the gage-clutch $l$, sleeve $m$, nut $q$, spring $r$, mandrel $f$, and nut or collar $h$, substantially as shown and described.

2. The combination of the sliding clutch-sleeve $m$, spring $r$, for throwing forward said sleeve to close the chuck, the lever $t\ u$, link $v$, and lever $w\ x$, as and for the purpose set forth.

CHAS. V. WOERD.

Witnesses:
  FRANCIS GOULD,
  M. W. FROTHINGHAM.